Figure 1:
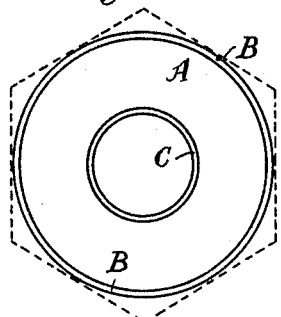

C. BAUER.
LOCKING WASHER.
APPLICATION FILED JAN. 22, 1908.

1,020,738.

Patented Mar. 19, 1912.

Witnesses,
Joseph M. Ward,
Edward H. Allen

Inventor,
Charles Bauer,
by Crosby & Gregory
attys.

UNITED STATES PATENT OFFICE.

CHARLES BAUER, OF LONDON, ENGLAND.

LOCKING-WASHER.

1,020,738.  Specification of Letters Patent.  Patented Mar. 19, 1912.

Application filed January 22, 1908. Serial No. 412,141.

*To all whom it may concern:*

Be it known that I, CHARLES BAUER, a subject of the King of Great Britain and Ireland, residing in London, England, have invented a new and Improved Locking-Washer, of which the following is a specification.

This invention has reference to improved means for preventing the unintentional unscrewing of bolts or nuts which frequently occurs when subjected to considerable vibration.

The tendency of bolts or nuts "slacking back" or unscrewing when subjected to vibration has for very many years been well known to engineers and many devices and means have been proposed—some are in actual use—to overcome the said defect. Not one of these, however, meets all the requirements; for not only should the nut or the like be prevented from accidentally unscrewing by the vibration, but the device should not be to any great extent adversely affected by ordinary changes of temperature. Further, the nut or bolt should be capable of being screwed up to any desired extent, and the head or nut should have a flat bearing when screwed up. The thread of the bolt and of the nut should not be injured or deformed, nor should the nut be weakened by splitting or saw cutting. The nut should, as far as possible, be an ordinary nut, that is to say, adapted to be screwed up or unscrewed in the ordinary way, by a spanner, and without necessitating the use of special tools or appliances. The means to prevent unscrewing should also be simple in construction and use and cheap to make.

It is well known that when wood piles are driven the exposed end on which the blows are delivered is provided with a metal ring to prevent the pile splitting; also, in fastening rail-chairs on sleepers, wood treenails are in some countries employed which serve to retain the holding down spikes or bolts more securely than these would be without the wood treenails, the wood not only exercising a most powerful frictional grip, but by its elasticity the very considerable shocks to which the rail-chairs are subjected are effectively taken up. There is, therefore, ample evidence to the effect that when a comparatively soft material as wood is properly confined it will withstand considerable compression and shocks and my invention contemplates the employment of wood, or other material, having the necessary further qualities to be hereinafter referred to, in the form of a washer and in conjunction, or combination, therewith means for confining the material, all as hereinafter described.

The material to be used should possess all the following qualities, viz:—A large coefficient of friction with metal; it should be to some extent elastic or springy; it should adapt itself to minor inequalities or roughness of surface when under pressure; it should be sufficiently homogeneous to prevent its particles being displaced laterally when a nut or bolt in close contact therewith is rotated; if the face of the nut or the part against which the nut bears be formed with slight hollows, the material, after the nut has been tightened up, should expand to fill up or partly fill up said hollows; it should not be affected by atmospheric changes and should be damp and rot-proof, or easily rendered so; finally it should be cheap and easily worked.

My experiments, so far, though not very exhaustive show that box, greenheart and ash are varieties of wood possessing to a remarkable degree the necessary qualities to render them fit to be used for my purpose.

Figure 2:
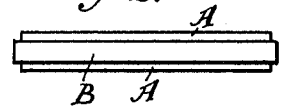
Figure 3:
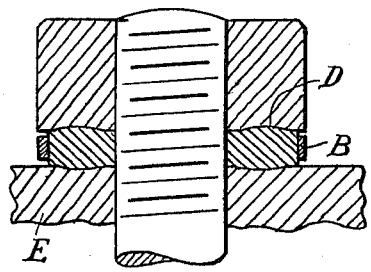
Figure 4:
Figure 5:
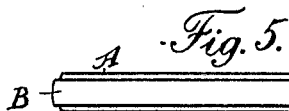
Figure 6:
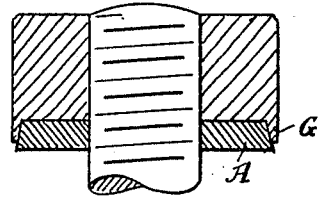
Figure 7:
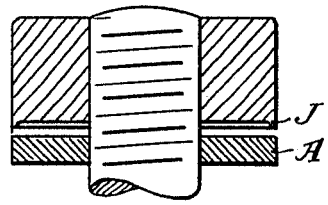
Figure 8:

In the accompanying drawings:—Figure 1 is a plan view and Fig. 2 a side elevation of the most simple form of my invention. Fig. 3 is a sectional elevation showing a nut, washer and part of a machine frame, the first and last being made with hollows. Fig. 4, shows a construction of washer having a concave periphery to have a strip of thin metal or wire wound around it. Fig. 5, shows a washer having a convex periphery. Fig. 6, shows a combined washer and nut. Fig. 7, shows a nut formed with a small projecting rib to engage the outer edge of the washer to prevent spreading. Fig. 8, shows a nut having a washer let into it.

The cheapest and most simple form of my invention consists in a wooden washer A, around the periphery of which I fix, to fit tightly, a metal ring B, so that no matter what pressure—of course within reasonable limits—be brought to bear, the wood cannot either split or be displaced laterally where it is encompassed. The ring should be narrower than the washer to such an extent that the latter will take all the compression strains while the ring will effectually prevent the expansion of the washer when under compression. The aperture in the center may also be provided with a tightly fitting ring, C, to prevent the material collapsing, but I do not consider this to be absolutely necessary, as even if there were risk of such inward distortion it can be easily obviated by making the aperture of a size that the washer will fit snugly on the bolt.

In view of the fact that the co-efficient of friction between metal and wood is several times greater than that between metal and metal it will be obvious that by my improved washer there is such an increased frictional engagement as compared with that when an ordinary metal washer is used—pressures being equal—that that engagement alone would in most instances be quite sufficient to effectively prevent "slacking back" of the nut by vibration. In view, however, of the fact that wood is comparatively soft, when the nut is tightened up the wood will be pressed into and engage or fit in any little roughness both on the nut and the article against which the washer abuts and thereby still further increase the retaining power of the washer. But my invention also contemplates forming the metal parts with which the washer contacts with slight hollows D, so that after the nut has been tightened up the fibers of the wood may expand at those parts to fill up or partly fill up said hollows. This form of my invention is illustrated in Fig. 3, wherein D are the hollows formed in the face of the nut A and on the face of a part E of a machine. The hollows should not have sharp edges as these might injure the face of the washer by cutting into it when the nut is being screwed up or unscrewed.

The ring may be made of any suitable metal its functions being to render the washer "unspreadable" and so long as it effects that purpose it may be either without a joint or it may be welded or made of a strip of metal passed around to fit tightly on the washer and the ends secured in any suitable manner; or a thin wire may be coiled around the washer and the ends secured (Fig. 4). If the ring be made of a strip of metal or of thin wire, the edge of the washer may be made slightly concave so that the strip or wire fit centrally, as shown in Fig. 4. Or, as shown in Fig. 5, the edge of the washer may be rounded more or less and the ring made to fit either by rolling the strip to a corresponding form, or, if a jointless ring be used, by closing in the edges of the latter after having been applied. The edges of the ring may be formed with serrations if desired, for example as at F, to serve, when pressed onto or into the washer, to hold it in position thereon. Always provided the ring serves its proper function as aforesaid it may be made ornamental. The ring may be applied hot, so as to be "shrunk" on the washer, and it may be galvanized or tinned or otherwise preserved against corrosion.

Instead of attaching the ring to the washer, as described, I may, as shown in Fig. 6, form the nut with a projecting rim or ring G, into the space thereby formed I force the washer the latter projecting a slight but sufficient distance beyond the edge of the projecting ring. Or, as shown in Fig. 7, I may employ a plain wood washer and form the contact face of the nut with a small rib, J, which will first contact with and grip the outer edge of the washer.

I have described my invention as comprising a washer made of wood combined with means to prevent "spreading" without at the same time preventing contact of the washer with the nut and also with the frame or other part against which it is tightened up, but as will be understood from the earlier part of this specification I do not limit myself to the employment of wood, as other material natural or artificial may be used so long as it possesses to a sufficient degree the qualities to render it fit for use and as enumerated. If a wooden washer be used this may be made either with or across the grain.

The wood washers may be creosoted or otherwise treated in any known manner to render them damp and rot-proof and proof against attack by vermin or insects.

The nut may be formed with a circular and preferably tapering groove, as shown in Fig. 8, to fit over a correspondingly shaped washer or rib thereon, or a series of wood blocks may be fitted in the nut, or into a separate metal washer.

What I claim as my invention and desire to secure by Letters Patent, is:—

1. Means to prevent loosening of nuts by vibration, comprising a non-metallic washer-like member of fibrous material to some extent elastic and having a large co-efficient of friction with metal and having exposed opposite faces adapted to engage directly the inner face of the nut and the outer face of the bolt-supporting object, respectively, and means of less width than the thickness of the washer-like member to engage the periphery of and prevent lateral derangement of said member.

2. A centrally apertured locking washer of non-metallic material to some extent elastic and having a large co-efficient of friction when contacting with metal and having its opposite faces completely exposed, a metallic ring tightly fitting and permanently secured in said aperture, a separate non-extensible binder tightly embracing the periphery of the washer, and a nut having a depression in its seating face to engage and contact directly with the exposed adjacent face of the washer.

3. Means to prevent loosening of nuts by vibration, comprising a centrally apertured wooden washer having its opposite faces completely exposed, a metallic ring tightly fitting and permanently secured in said aperture, and a separate non-extensible binder tightly embracing and permanently attached to the periphery of the washer, the completely exposed opposite faces of the washer being interposed between and directly engaging the inner face of the nut and the outer face of the bolt-supporting object.

4. A locking washer of relatively soft and moderately elastic, non-metallic fibrous material having a large coefficient of friction with metal, a non-extensible binder tightly embracing and permanently attached to the periphery of the washer, leaving its faces completely exposed, and a nut to seat on the washer and having a depression in its seating or contacting face, to engage directly the exposed face of the washer.

In testimony whereof I have signed my name to this specification in the presence of two subscribing witnesses.

CHAS. BAUER.

Witnesses:
A. E. WILLIAMS,
M. M. S. POLLON.

Copies of this patent may be obtained for five cents each, by addressing the "Commissioner of Patents, Washington, D. C."